United States Patent [19]
Barry

[11] 3,803,866
[45] Apr. 16, 1974

[54] START WINDING PROTECTION DEVICE
[75] Inventor: Vincent T. Barry, Camillus, N.Y.
[73] Assignee: Carrier Corporation, Syracuse, N.Y.
[22] Filed: Oct. 30, 1972
[21] Appl. No.: 301,923

[52] U.S. Cl. .................................. 62/230, 318/229
[51] Int. Cl. .............................................. F25b 1/00
[58] Field of Search ............ 62/158, 161, 215, 226, 62/230; 318/229, 472, 473

[56] References Cited
UNITED STATES PATENTS
| | | | |
|---|---|---|---|
| 2,688,113 | 8/1954 | Grimshaw | 62/230 |
| 2,261,250 | 11/1941 | Haddad | 318/229 |
| 3,303,402 | 2/1967 | Mahn | 318/229 |

Primary Examiner—Meyer Perlin
Attorney, Agent, or Firm—J. Raymond Curtin

[57] ABSTRACT

An air conditioning system is provided to supply treated air to an area. The system includes a refrigeration unit comprising a motor driven compressor, a condenser, an evaporator and expansion means. The motor includes a run winding and a start winding connected in parallel. The start winding has a safety device operably connected thereto to limit the current flowing through the start winding when the current flowing through the safety device exceeds a predetermined magnitude. The safety device is further operable to thereafter permit normal flow of current to the start winding when the current flowing thereto has been reduced to a predetermined level.

2 Claims, 3 Drawing Figures

START WINDING PROTECTION DEVICE

BACKGROUND OF THE INVENTION

This invention relates to a safety device for use with permanent split capacitor motors of a type used to drive the compressor of a refrigeration unit employed in air conditioning systems, and in particular, to a safety device operably connected to the start winding of such motor to prevent flow of current thereto when the magnitude of such current exceeds a predetermined value.

The utilization of permanent split capacitor motors to drive the compressors of refrigeration units has become increasingly prevalent. Such a refrigeration unit, including the compressor, condenser, evaporator and expansion means, is typically employed in an air conditioning system, such as a room air conditioner.

The permanent split capacitor motor is a single phase induction motor equipped with an auxiliary winding displaced in magnetic position from, and connected in parallel with, the main winding. A run capacitor is connected in series with the start winding. One of the operating characteristics of a permanent split capacitor motor is, as the load on the motor decreases, the current passing to the start winding increases. At extreme light load conditions or if a loss of refrigerant charge should occur, the current in the start winding substantially increases. Excessive current typically causes the windings to overheat, and in severe cases, to burn out.

Heretofore, it has been the practice to employ start windings having the capacity to safely pass current of a magnitude exceeding the current flowing during normal operating conditions in an attempt to prevent damage to the start winding. Even with such current compensation, too often the start winding would fail due to its inability to accept the current flowing therethrough.

The foregoing suggests that a fuse be installed in series with the start winding to prevent passage thereto of current exceeding a predetermined magnitude. However, as noted before, permanent split capacitor motors are typically used to drive the compressor of refrigeration units employed in air conditioning systems. Very often, such compressor motors are hermetically sealed within a welded shell. Therefore, as is obvious, it would not be practicable to utilize a fuse in series with the start winding, since failure of the fuse would produce results equivalent to failure of the start winding. That is to say, failure of the fuse would be tantamount to failure of the compressor motor.

Even if the fuse could be located outside the welded shell, the failure of such fuse would, in most cases, result in the owner of the air conditioning system requiring a serviceman to recognize the problem and fix the same. Obviously, such service call would be both inconvenient and expensive.

SUMMARY OF THE INVENTION

It is therefore an object of the present invention to provide a safety device wherein the flow of current to the start winding is limited when the magnitude of the current flowing through the device exceeds a predetermined level. The normal flow of current is subsequently reestablished when the magnitude of the current passing through the safety device is reduced to a predetermined level.

It is a further object of this invention to provide a temperature responsive resistance element connected in series with the start winding of a compressor motor, the resistance of the responsive element substantially increasing as a function of its own temperature, the temperature thereof being substantially increased when the flow of current therethrough exceeds a predetermined level.

These and other objects of the present invention are obtained by utilizing a positive temperature coefficient resistance element functioning as a safety device, which is electrically connected in series with the start winding of a permanent split capacitor motor. The motor is employed to drive the compressor of a refrigeration unit further including a condenser, an evaporator and expansion means connected in a closed circuit of an air conditioning system.

The safety device permits the passage of current to the start winding so long as the magnitude thereof does not exceed a predetermined level. If the magnitude of the current should exceed a predetermined level, the safety device functions to reduce the flow of current to the start winding to its predetermined level.

The specific details of the invention and their mode of function will be made most manifest and particularly pointed out in conjunction with the accompanying drawings.

DESCRIPTION OF THE PREFERRED EMBODIMENT

Figure 1:
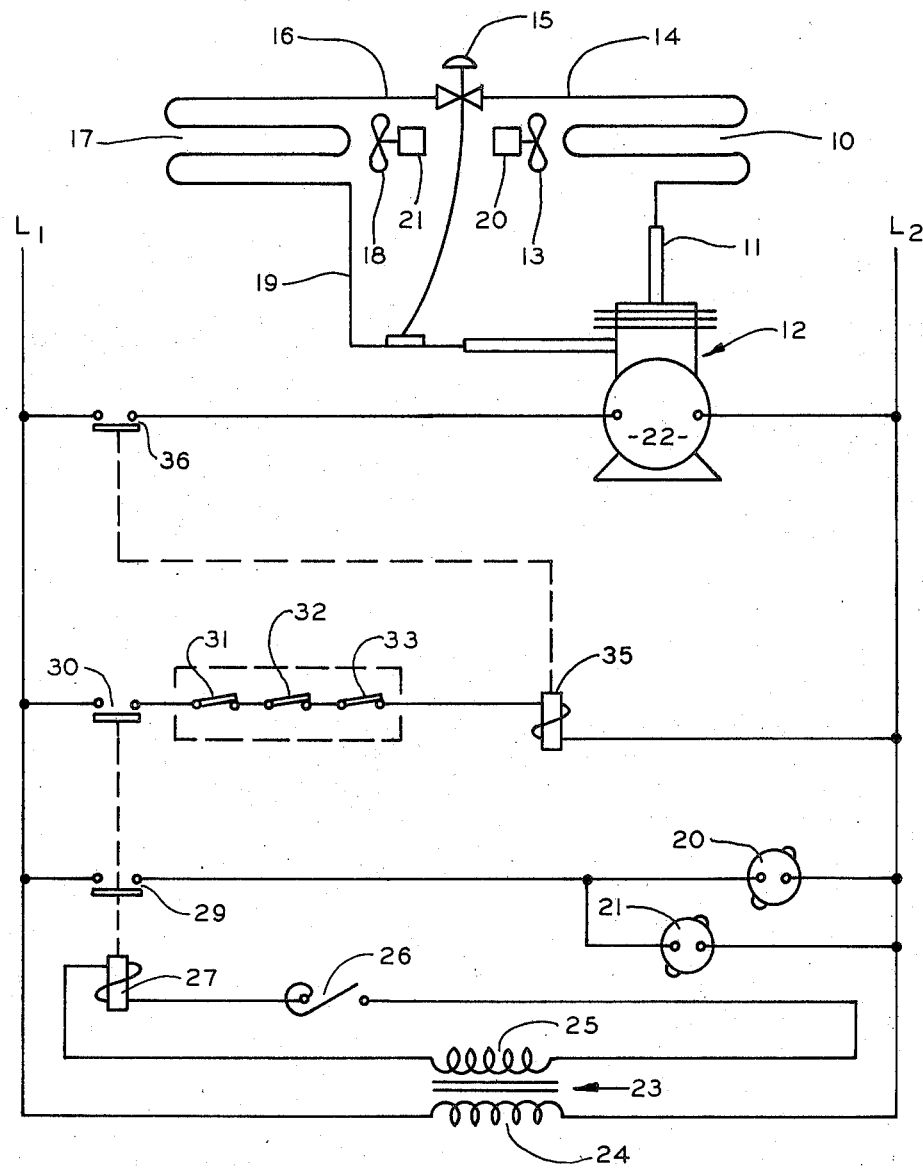
FIG. 1 is a schematic view of a typical air conditioning system including a refrigeration unit illustrating the present invention.

Referring to the drawing, and in particular to FIG. 1, there is schematically shown an air conditioning system employing a refrigeration unit incorporating a safety device in accordance with my invention. The refrigeration unit is representative of a type utilized in window mounted room air conditioners.

An outdoor heat exchange coil or condenser 10 is connected by means of line 11 to the discharge side of a suitable refrigerant compression mechanism, for example, a reciprocating type compressor 12. The gaseous refrigerant produced in compressor 12 flows to condenser 10 and is condensed by ambient air routed over the surface of the condenser by an outdoor fan 13. Liquid refrigerant formed in condenser 10 flows via line 14, thermal expansion valve 15, and line 16 to indoor heat exchange coil or evaporator 17. It is understood that other suitable expansion devices, such as a capillary tube, may be employed in place of expansion valve 15.

Liquid refrigerant in evaporator 17 is converted to vaporous refrigerant as it extracts heat from the medium, for example, air passed over its surface by fan 18. The cooled air is discharged into the area being conditioned through a suitable outlet (not shown). Vaporous refrigerant from evaporator 17 flows via suction line 19 to compressor 12 to complete the refrigerant flow cycle.

Again referring to FIG. 1, a preferred form of the control circuit for the air conditioning system refrigeration unit hereinabove described is schematically shown. A suitable source of electric power, represented by lines L1 and L2, is connected to primary winding 24 of transformer 23. It is understood a polyphase source of electric power may be employed if the circuit is suitably modified.

A secondary winding 25 of transformer 23 is connected to a switch 26 responsive to the temperature of air circulating in the area being served by the equipment. When thermally actuated switch 26 is closed, current is supplied to control relay 27. Energization of control relay 27 closes normally open switches 29 and 30. When switch 29 has been closed, fan motors 20 and 21 are energized, thereby actuating fans 13 and 18. The closure of switch 30 supplies current through normally closed switches 31, 32 and 33 to compressor contactor coil 35. The energization of compressor contactor coil 35 closes normally open switch 36. The closure of normally open switch 36 connects motor 22 across lines L1 and L2, thereby starting compressor 12.

Normally closed switches 31, 32 and 33 are safety devices; respectively high pressure cutout, a low pressure cutout and a CUTOUT, motor overload circuit. Other safety devices known in the art, such as a low oil pressure cutout, may also be employed. The occurrence of the condition protected against will open the particular switch, thereby either preventing the compressor motor from starting, or stopping compressor motor during the normal operation of the system.

Figure 2:
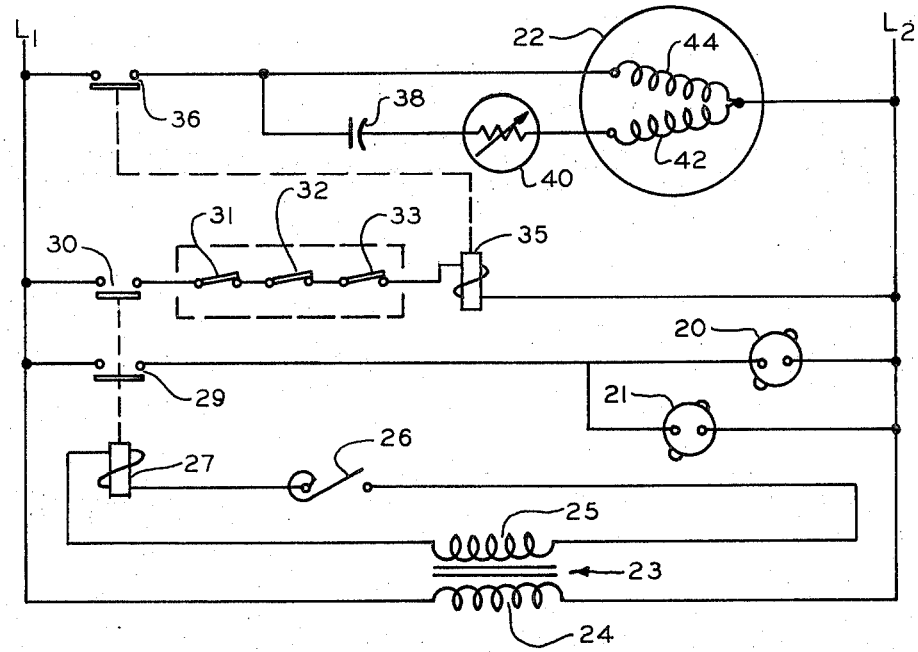
FIG. 2 is an enlarged, detailed schematic wiring diagram of a portion of the air conditioning system illustrated in FIG. 1 showing a preferred form of safety device in accordance with the present invention.

Referring now to FIG. 2, there is shown an enlarged detailed view of a portion of the control circuit shown in FIG. 1, illustrating details of my invention.

Motor 22 is of the type known to those skilled in the art as a permanent split capacitor motor. The permanent split capacitor motor includes parallel connected windings 42 and 44, respectively, the auxiliary or start winding and the main winding. Connected in series with auxiliary winding 42 is temperature sensitive resistance element 40, shown as a positive temperature coefficient thermistor. As is known to those skilled in the art, the positive temperature coefficient thermistor has a characteristic such that its resistance increases as a function of its temperature. Connected in series with element 40 and start winding 42 is run capacitor 38.

Heretofore, it has been known to employ such positive temperature coefficient resistance elements in single phase starting motors. For example, U.S. Pat. No. 3,303,402, issued Feb. 7, 1967, R. L. Martin, inventor, shows a positive temperature coefficient resistance element employed in series with a start capacitor and start winding and in parallel with a run capacitor. The resistance element is employed to selectively switch either the run capacitor or the start capacitor into or out of the circuit. However, unlike the present invention, the resistance element disclosed in the aforecited patent does not illustrate the use of the resistance element to limit current flowing through the start winding if the magnitude thereof exceeds a predetermined level. The resistance element employed in the cited patent functions during normal operation of the motor, whereas the resistance element of the present invention functions as a safety device to prevent damage to the start winding if abnormal operating conditions should occur.

As noted hereinbefore, permanent split capacitor motors have the characteristic that, as the load on the compressor motor decreases, the voltage across the capacitor increases. Loss of refrigerant charge or light load will produce the increased load across the run capacitor. As the voltage across the run capacitor increases, the current passing through the start winding also increases. At times, the start winding current passing therethrough may exceed the designed operating current for such start winding, and the start winding will burn out due to its inability to accept the current passing therethrough.

As noted hereinbefore, it has been the practice to use oversized start windings; however, even where such windings have been employed, the current passing therethrough has at times exceeded the ability for the winding to handle the same without burning out. As noted before, the compressor motor in air conditioning applications employing permanent split capacitor motors is typically hermetically sealed within a welded steel shell. Thus, any failure of the start winding results in a failure of the compressor and its motor. As is obvious, the replacement of the hermetically sealed assembly resulting from such winding failure is quite expensive and therefore undesirable.

Figure 3:
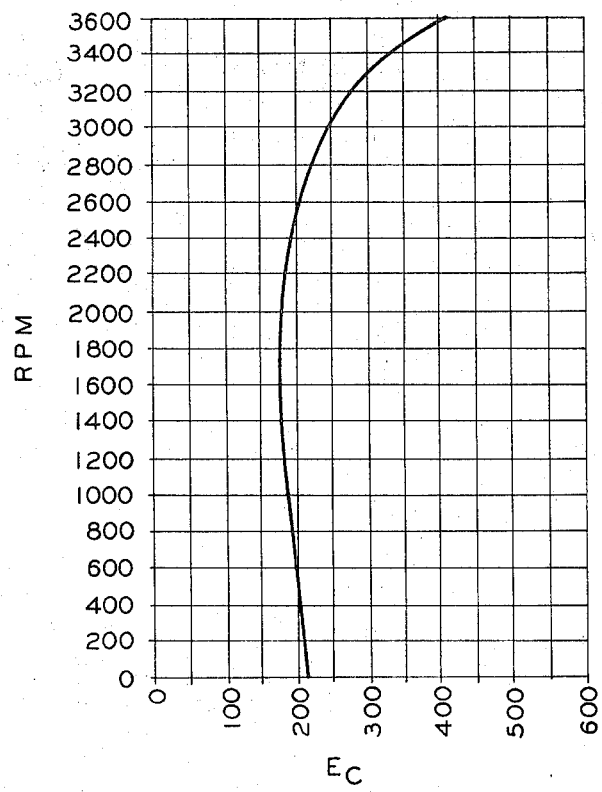
FIG. 3 graphically illustrates operating characteristics of a permanent split capacitor motor.

With reference to FIG. 3, there is graphically illustrated a typical operating curve for a permanent split capacitor motor. As is clearly evident, the current, which is proportional to the voltage (Ec), substantially increases as the rpm of the compressor motor increase. As is known to those skilled in the art, the rpm of a motor will increase when the load thereon decreases, and will similarly decrease as the load thereon increases.

With particular reference to FIG. 2, when the load on the compressor motor has decreased so that the current flowing through resistance element 40 to start winding 42 would be of a magnitude so that winding might be damaged or ruined thereby, the resistance of element 40 substantially increases to limit the flow of current therethrough to its predetermined level. Such action operates to prevent damage to start winding 42. When the load on the compressor motor increases so as to decrease the current flowing through the resistance element to its normal level, the device permits the full passage of such current to the start winding.

In addition to protecting the start winding, the present invention functions to limit the voltage across run capacitor 38 to a predetermined level. Thus, if there is a loss of refrigerant charge from the air conditioning system, the resistance of device 40 will substantially increase due to the reduced load. The increased resistance will limit the voltage (Ec) across run capacitor capacitor 38 to a safe level.

Although, the preferred embodiment has been illustrated as having device 40 connected in series with winding 42 and spaced therefrom, it is within the scope of this invention to have device 40 connected in series with winding 42 and disposed directly in contact therewith. Thus, device 40 may then be sensitive to not only increased current flow, but also to an increase in the temperature of winding 42 caused by the increased current flowing therethrough. By placing device 40 so that it is in heat transfer relation with winding 42, an increase in the temperature of winding 42 will concurrently cause an increase in the temperature of device 40. Since the resistance of device 40 will increase upon a temperature increase of such device, the current flowing to winding 42 will thus be reduced as is desired.

Although the use of thermistors as fuses has been heretofore known, no one to my knowledge has recognized the need for a safety device of the type herein disclosed to protect the start winding of a permanent split capacitor motor. The safety device prevents damage to, or failure of, the start winding and, in particular, may be satisfactorily employed in a hermetically sealed compressor motor.

While I have a described and illustrated a preferred embodiment of my invention my invention should not be limited thereto, but may be otherwise embodied within the scope of the following claims.

1. In an air conditioning system operable to supply treated air to an area including a refrigeration unit comprising a compressor, a condenser, an evaporator and expansion means connected in a closed circuit, a motor for actuating said compressor, said motor having a run winding and a start winding connected in parallel, said start winding having a capacitor connected in series therewith, the improvement which comprises:

a safety device operably connected to said start winding, said device comprising a temperature responsive resistance element connected in series with said start winding of said compressor motor, the resistance of said responsive element substantially increasing as a function of its own temperature, the temperature thereof being increased by the flow of current therethrough, the resistance increasing to a level to limit the current flow to said start winding when the current flowing through the resistance element exceeds a predetermined magnitude, the reduction of the magnitude of said current flowing therethrough to said predetermined level causing the resistance of said responsive element to return to a level so the normal flow of current again passes to said start winding.

2. The combination in accordance with claim 1 wherein the safety device is placed in direct contact with the start winding so that an increase in the temperature of the winding caused by an increase in the current flowing therethrough will result in a concurrent increase in the temperature of the safety device.

* * * * *